UNITED STATES PATENT OFFICE.

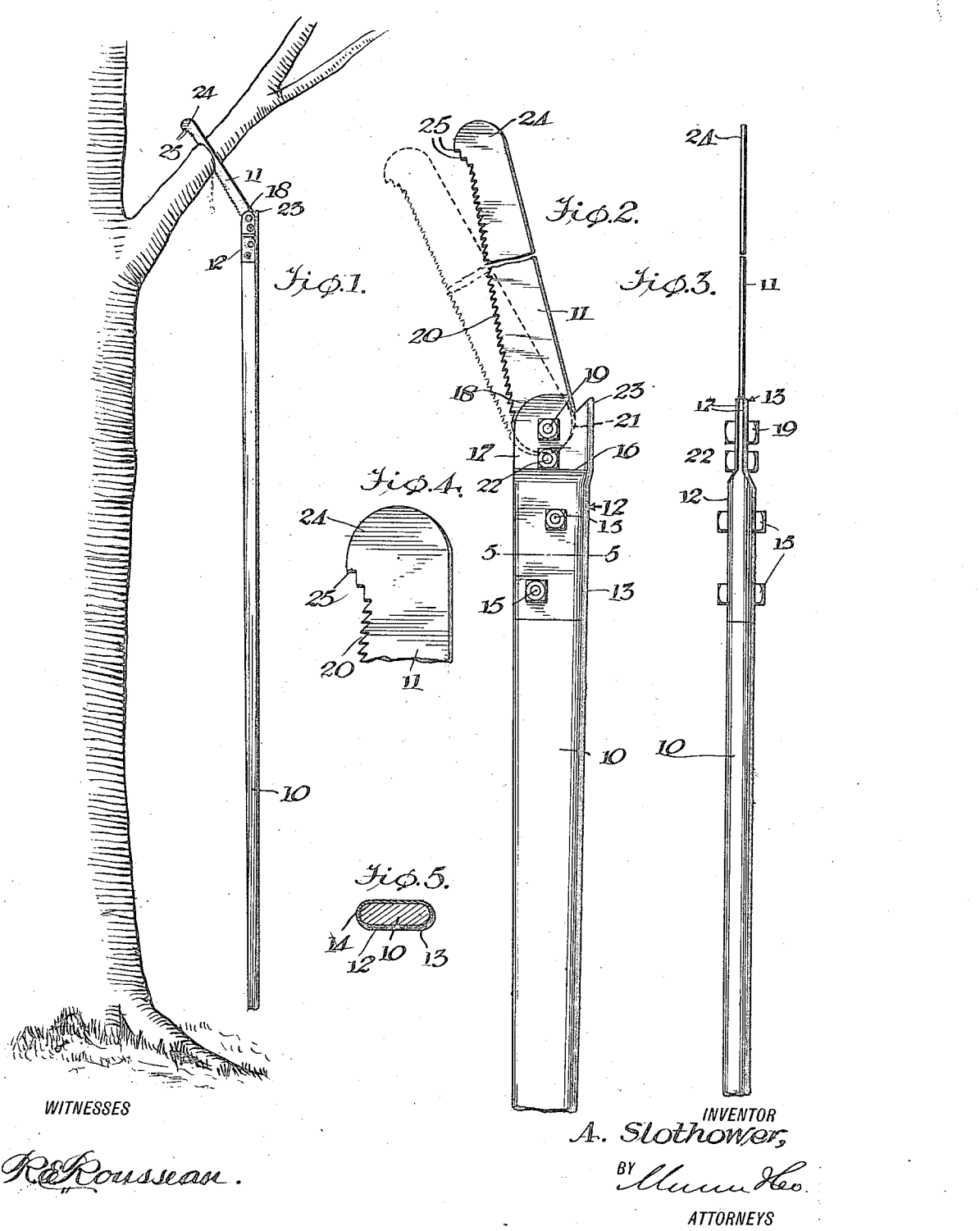

AARON SLOTHOWER, OF WARREN, OREGON.

PRUNING SAW.

1,423,506. Specification of Letters Patent. Patented July 18, 1922.

Application filed June 23, 1920. Serial No. 391,238.

*To all whom it may concern:*

Be it known that I, AARON SLOTHOWER, a citizen of the United States, and a resident of Warren, in the county of Columbia and State of Oregon, have invented certain new and useful Improvements in Pruning Saws, of which the following is a specification.

My invention relates to new and useful improvements in pruning saws particularly designed for use in sawing limbs of trees which are not accessible with an ordinary saw, the device being especially adapted for use in cutting the limbs or green wood at high elevations for topping and pruning trees and particularly by exerting a pulling action upon the saw.

A further object of the invention is to provide a pruning saw having novel means for securing a handle and blade in proper relative positions, permitting the handle to be made flat or of oblong cross section, so that the position of the saw teeth relative to the limb to be cut may be determined by the sense of feeling, while the saw blade is mounted in a novel manner to be adjustably positioned with respect to the angle formed between it and the handle whereby the proper sawing or cutting action will be effected, while the blade and handle socket to which the blade is attached, are provided with improved means for removing limbs or branches which become lodged in the tree, the blade being provided with means for pulling out the severed material including twigs, and the socket or holder being provided with means for pushing such material which may lodge at the far side of the tree, therefrom, said means of the blade also serving to cut small twigs and branches too small to be cut with the regular saw teeth and also serving to cut through with one swift motion, the remaining part of the limb after the sawing operation has been substantially completed, and the branch starts to fall, thus preventing the branch from pulling the bark and remaining part uncut, so as to obviate splitting and injury to the tree.

Other and further objects of my invention will become readily apparent to those skilled in the art, from a consideration of the following description when taken in conjunction with the accompanying drawings, wherein:—

Figure 1 is a perspective view of my improved pruning saw showing the manner of using the same in severing tree limbs, Figure 2 is an enlarged fragmentary side elevation of the saw, Figure 3 is a back end view, Figure 4 is an enlarged fragmentary view in side elevation of the tip or free end of the saw blade, and showing the cutting edges or teeth thereon, and Figure 5 is a transverse sectional view taken on the line 5—5 of Figure 2.

Referring to the drawings in detail, in which like reference characters designate corresponding parts throughout the several views, my improved pruning saw is shown as comprising a handle 10 which may be made of any suitable length, such as six, eight, ten or twelve feet, depending upon the type or kind of trees in connection with which it is adapted for especial use. This handle is relatively flat, being of wood and oblong cross section with slightly rounded corners furnishing an efficient gripping surface for the hands and preventing the handle from turning when once gripped. Connected to the handle and furnishing means for attaching a saw blade 11 is a socket or holder 12 which is preferably made of a section of sheet metal or a blank of proper gauge or thickness folded upon itself or bent in rounding formation as shown at 13 to form a back portion, while the opposite edges are brought together as indicated at 14, thus substantially completely enclosing the handle at one end. The opposed sides of the socket are provided with openings adapted to register with corresponding openings in the handle preferably arranged in staggered relation so as to receive fastening and clamping bolts 15. By this means, the connection between the handle and the socket or holder is rendered firm and secure, the handle being reduced to accommodate the socket if desired and the parts being prevented from turning one with respect to the other, as well as rendering the same detachable. Also it will be observed that the socket or holder is made in the form of a connecting plate which is very strong and simple, consisting of one piece of metal formed to make both sides of the connection.

Beyond the socket portion proper which receives the end of the handle, the sides are bent inwardly toward each other as indicated at 16, beyond which the opposed sides 17 are disposed closely adjacent to each other to receive the inner end of the blade 11 therebetween, the free end being rounded as indicated at 18 and the opposed sides being apertured to register with a corresponding aperture in the saw blade for receiving a pivot or bolt 19 by which the blade may be adjusted angularly with respect to the handle to extend in alinement therewith or at various obtuse angles with respect thereto at the toothed or cutting edge 20, the teeth of the latter being preferably extended toward the operator so as to cut with a drawing or pulling action.

The inner end of the saw blade is also rounded or made convex, as indicated at 21, preferably eccentric to the bolt 19 as a center or pivot, while the bolts 19 and 22 are threadedly engaged with the opposed sides 17 in order to hold the saw blade in the desired angularly adjusted position. The bolt 22 serves as well as the bolt 19 to clamp the sides together and engages in addition, the edge 21 which has its points of greatest eccentricity at the longitudinal edges of the blade at the back edge and at the front edge where the teeth 20 are provided, so as to limit the movement of the blade and frictionally or bindingly engage therewith, so that the blade may be held rigidly in position when adjusted. The blade is limited in its rearward movement to a position in alinement with the socket and handle and in its forward movement is limited to a position somewhat distant from a right angular position with respect to the handle and socket or about 120°.

At the back of the socket or holder, it is notched at its forward end to form a pointed projection or spur 23 adapted for use in engaging limbs or branches which have been cut and lodged in the tree, for the purpose of pushing the same from such lodged position to cause the same to fall to the ground, this part being particularly desirable in pushing the limbs through the far side of the tree and obviating the necessity of going around the tree to pull the limb therefrom, while the device itself obviates the necessity of employing a step-ladder or like means of elevating the operator in order to render accessible, the limbs or branches to be cut. The saw blade is tapered toward its free end and at the extremity is enlarged in width, as indicated at 24, so as to project from the bottom or front toothed edge 20, where it is provided with set rearwardly facing cutting blades or edges 25 disposed transversely at right angles to the length of the saw blade and parallel to each other so as to operate like the saw teeth 20, with a pulling or drawing action.

In the use of the device, the device is applied as shown in Figure 1 of the drawings, the saw blade being set and clamped in the desired angular relation with respect to the handle by first loosening the bolts 19 and 22 and then tightening the nut thereof to securely clamp the blade between the side portions 17 and against the edge portion 21 as respects the bolt 22. The desired angle is determined by adjusting the saw and if the teeth thereof take hold too hard, the saw is straightened, or it is set at a greater angle if the teeth do not take hold enough. It will be obvious that by making the handle the proper length, a tree can be pruned from the ground without the necessity of climbing the tree or using a ladder. If any of the limbs or branches or other material which has been cut, lodges in the tree, the prong or projection 23 may be employed for pushing the same out of the tree in case the same does not fall to the ground, especially branches which have fallen to the opposite side of the tree from where the operator is positioned and where they cannot be pulled out unless the operator goes to the opposite side of the tree, thus obviating considerable additional work. The blades or cutting edges 25 form teeth which may be used to catch hold of any severed material for pulling the same out of the tree at the same side from which the operator is working, before using the projection or spur 23, and these blades are also used for cutting out twigs and branches too small to be cut with the regular saw teeth and also for cutting through with one swift motion, the remaining part of the cut after the sawing teeth have cut through so far that the limb or branch starts to fall, thus preventing it from splitting and injuring the tree or limb where severed. Also, he manner of connecting the saw blade to the socket or holder formed by the connecting plate or plates allowing for adjusting the saw at different angles and by reason of using the clamping bolts as described, it is unnecessary to provide a series of holes in either the plate or socket or in the blade, and consequently weakening of the same is prevented. In addition, small variations in adjustment can be obtained by the construction described which cannot be obtained where two or three perforations are provided and the clamping action is more positive. Thus, the blade can be held adjusted to the smallest fraction of an inch. In addition, by employing the flat wooden handle, which as will be seen from Figure 5 of the drawings, is substantially oval-shaped in cross section, the operator can better control the operation of the saw than with a round handle, and can tell by the feel of the handle if the saw blade or teeth of the blade are properly disposed, that is, up, down or sideways, and this cannot be done with the ordinary round handle.

In view of the foregoing, it is thought that the operation of the device will be readily understood, and in view of the simplicity and practical value, that it will commend itself to those skilled in the art.

Having thus described my invention, what I claim is:—

1. A pruning saw comprising a handle of flat substantially oval cross section, said handle being of rectilinear formation, a socket mounted on one end of the handle, said socket comprising a section of sheet metal bent upon itself to envelop the handle, fastening means passed through the handle and socket sides, said sides being disposed inwardly toward each other beyond the free end of the handle and having a notch at the free end thereof and forming a spur at the bight portion forming the back of the socket and handle, and a blade carried between said side portions.

2. A pruning saw comprising a handle of substantially oval cross section, said handle being of rectilinear formation, a socket mounted on one end of the handle, said socket comprising a section of sheet metal bent upon itself to envelop the handle, fastening means passed through the handle and socket sides, said sides being disposed inwardly toward each other beyond the free end of the handle and having a notch at the free end thereof and forming a spur at the bight portion forming the back of the socket and handle, a saw blade of tapered formation having a rounded end portion disposed between said side portions, a clamping bolt serving to pivot said blade through said sides with the blade disposed therebetween, a clamping member engaged through the sides and cooperating with said rounded end of the blade to frictionally hold the latter in adjusted angular relation to the handle, said rounded edge being cut eccentric to the pivot of the blade, and a projection on the free end of the saw blade having teeth facing the handle, substantially as and for the purposes set forth.

3. A pruning saw comprising a handle, a metallic attaching member carried by the handle, and comprising a U-shaped member taken cross sectionally formed with an integral spur projecting forwardly at the free end and bight portion thereof, and an adjustable blade carried within said attaching member between the sides thereof so as to cooperate with said spur.

4. A pruning saw comprising a handle, a metallic attaching member carried by the handle, and comprising a folded blank provided with a rebent back portion having a forwardly projecting spur at the back and free end thereof, and a saw blade pivoted for angular adjustment to said attaching member adjacent to said spur, the back edge of the blade adjacent to the pivot thereof cooperating with the notch formed by the inner edges of the spur to push or dislodge loose branches, substantially in the manner set forth.

5. A pruning saw comprising a handle, a saw blade attached to one end thereof, said blade having a projection at its toothed edge and adjacent to the free end thereof provided with rearwardly facing stepped cutting edges extending transversely at right angles to the length of the blade.

6. A pruning saw comprising a handle, a rebent U-shaped socket attached to the handle and having a closed bight portion along one edge thereof and opposed side portions, said socket receiving and enveloping the handle, connecting means passed through the socket and handle and clamping the same together, and a saw blade pivoted between the side portions of the socket beyond the free end of the handle, said side portions and said saw blade being disposed closely adjacent each other and offset inwardly and a clamping member passed through said offset portion cooperating with the adjacent edge of the blade to hold the latter in angularly adjusted positions.

7. A pruning saw comprising a handle, a metallic attaching member carried by the handle and comprising a U-shaped member taken cross sectionally formed with a spur projecting forwardly at the free end and bight portion thereof and a blade carried within said attaching member.

AARON SLOTHOWER.